(No Model.)
C. P. THRESHER.
FEATHERING PADDLE WHEEL.
No. 376,687.  Patented Jan. 17, 1888.
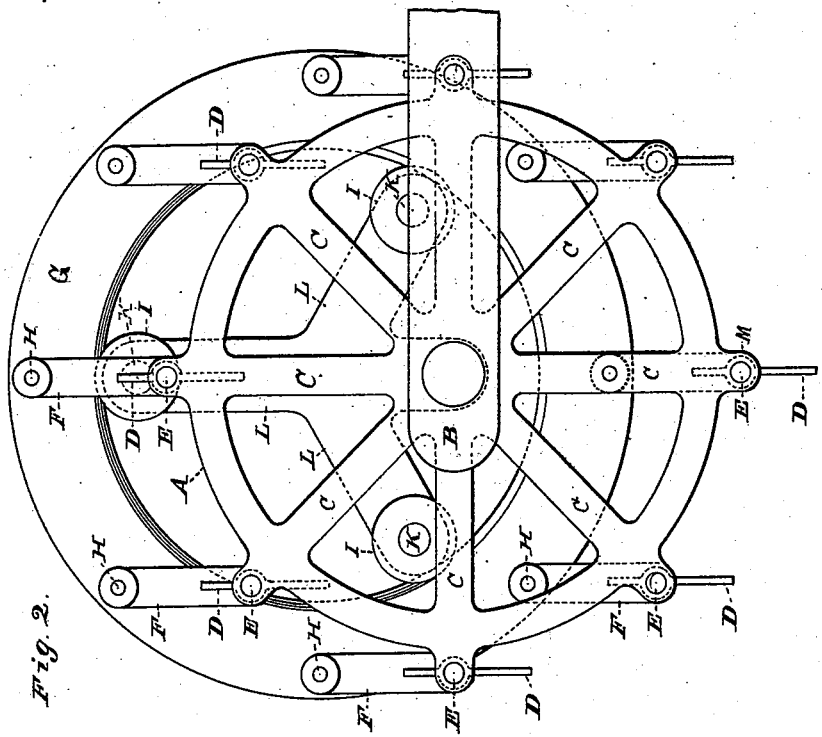
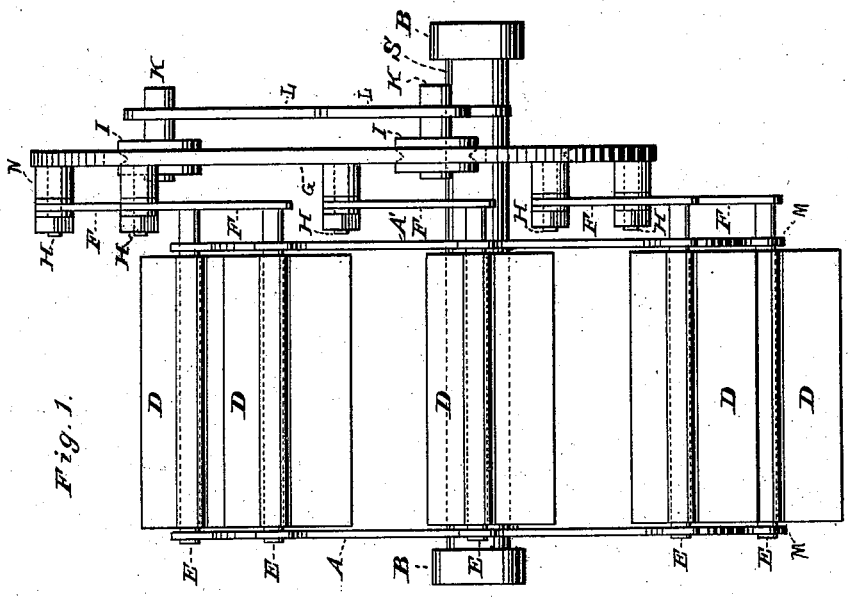
WITNESSES
Villette Anderson
M. B. Harris
INVENTOR
C. P. Thresher.
by E. W. Anderson
Attorney

UNITED STATES PATENT OFFICE.

CLARENCE P. THRESHER, OF WINONA, MINNESOTA.

FEATHERING PADDLE-WHEEL.

SPECIFICATION forming part of Letters Patent No. 376,687, dated January 17, 1888.

Application filed September 10, 1887. Serial No. 249,365. (No model.)

*To all whom it may concern:*

Be it known that I, CLARENCE P. THRESHER, a citizen of the United States, and a resident of Winona, in the county of Winona and State of Minnesota, have invented certain new and useful Improvements in Feathering Paddle-Wheels; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of this invention, and is a front view. Fig. 2 is a side view.

My invention relates to feathering paddle-wheels; and it consists in the construction and novel combination of parts, as hereinafter described.

Referring to the accompanying drawings, S designates the wheel-shaft journaled in the bearings B. The wheel proper consists of the two circular rims or frames A A', connected to the hub and shaft by the radiating spokes C. Bearing-lugs M stand outward from the rims A A' in a direct line with the spokes C.

D represents the paddles or floats, rigidly attached to the shafts E, journaled in the outstanding bearings M, the said paddles extending between the inner faces of the frames A A'. The shafts E project through the bearings on the frame A', and at their outer ends are provided with rigid arms F, pivotally connected at their opposite ends to the pins H, extending from an annular guide-rim, G. Sleeves or thimbles N retain the arms at a proper distance from the rim G, and a threaded nut is placed on the outer end of the pins.

The guide-rim G has its center above the shaft S, and rotates eccentrically to the paddle-wheel, thus holding the arms F and the paddles D in a vertical position, and causing the paddles to feather or to enter and clear the water with a small amount of frictional bearing on the wheel.

The guide-rim G is beveled on its inner circumference and revolves on the grooved rollers I, turning on bearings K at the outer ends of the frames or arms L.

The frames L may be secured to a convenient portion of the bearing-beam B by braces or brackets, and a strap or short arm may embrace the shaft S, as a further means of holding the frames L.

From the above description it is evident that the arms F must be of equal length, that a circle drawn from the centers of the shafts E, and a circle drawn from the centers of the pins H will be identical in size and touch the centers of the shafts E and pins H.

Having described this invention, what I claim, and desire to secure by Letters Patent, is—

1. The combination, with the shaft S and the bearings B, of the rims A A', having the outstanding bearings M, and having the radiating spokes and the hub, the shafts E, the paddles rigidly secured to the shafts, and the arms F, attached to the outer ends of the shafts E, substantially as specified.

2. The combination, with the shaft S, the rims A A', having the spokes and the hub, the paddles, the shafts E, and the rigid arms, of the guide-rim G, having its center above the shaft S, the frame portion L, the grooved rollers journaled on the bearings K at the outer ends of the frames, the pins H, extending from the guide-rim, and the thimbles and securing-nuts, substantially as specified.

3. In a feathering paddle-wheel, the combination of the shaft S, the bearings B, the rims A A', having the bearing-lugs, the radiating spokes and the hub, the paddles D, rigidly secured to the shafts E between the rims A A', the shafts E, extending through the bearings on the rims A', the arms F, extending from the shafts E, and pivoted on the pins H, the frames L, the rollers thereon, the guide-rim rotating on said rollers eccentric to the paddle-wheel, the bearings K, the thimbles, and the securing-nuts, substantially as described.

In testimony whereof I affix my signature in presence of two witnesses.

CLARENCE P. THRESHER.

Witnesses:
 J. N. MAYBURY,
 JOHN P. GLEASON.